US011379604B2

(12) United States Patent
Pearson et al.

(10) Patent No.: US 11,379,604 B2
(45) Date of Patent: Jul. 5, 2022

(54) SYSTEMS AND METHODS FOR ENCRYPTION OF CONTENT REQUEST DATA

(71) Applicant: GOOGLE LLC, Mountain View, CA (US)

(72) Inventors: Jonathan Paul Pearson, Mountain View, CA (US); Tian Xia, Mountain View, CA (US); Hyewon Jun, Mountain View, CA (US); Feng Gu, Mountain View, CA (US)

(73) Assignee: GOOGLE LLC, Mountain View, CA (US)

( * ) Notice: Subject to any disclaimer, the term of this patent is extended or adjusted under 35 U.S.C. 154(b) by 0 days.

(21) Appl. No.: 17/256,645

(22) PCT Filed: Apr. 1, 2020

(86) PCT No.: PCT/US2020/026139
§ 371 (c)(1),
(2) Date: Dec. 28, 2020

(87) PCT Pub. No.: WO2021/201859
PCT Pub. Date: Oct. 7, 2021

(65) Prior Publication Data
US 2022/0075891 A1 Mar. 10, 2022

(51) Int. Cl.
*H04L 29/06* (2006.01)
*G06F 21/62* (2013.01)
(Continued)

(52) U.S. Cl.
CPC ........ *G06F 21/6227* (2013.01); *H04L 9/0825* (2013.01); *H04L 67/10* (2013.01); *G06Q 30/0275* (2013.01); *H04L 67/20* (2013.01)

(58) Field of Classification Search
CPC ... G06F 21/6227; H04L 9/0825; H04L 67/10; H04L 67/20; H04L 9/14; H04L 63/0442; G06Q 30/0275
See application file for complete search history.

(56) References Cited

U.S. PATENT DOCUMENTS

| 2016/0078431 | A1* | 3/2016 | Ramachandran .. G06Q 30/0605 705/64 |
| 2017/0116607 | A1* | 4/2017 | Leighton ............... H04L 9/3213 |
| 2019/0182218 | A1* | 6/2019 | Tidwell ............... G06F 21/6254 |

OTHER PUBLICATIONS

Cui et al., "Multi-CDN: Towards Privacy in Content Delivery Networks", IEEE Transactions On Dependable and Secure Computing, Sep./Oct. 2020, vol. 17, No. 5, pp. 984-999 (16 pages).

(Continued)

*Primary Examiner* — Yogesh Paliwal
(74) *Attorney, Agent, or Firm* — Marshall, Gerstein & Borun LLP (57) ABSTRACT

Systems and methods of restricting storage of data received in content requests include a data processing system obtaining a public encryption key for a resource provider. The data processing system can receive a content request from an information resource of the resource provider running on a client device. The request can include one or more key values corresponding to one or more data keys. The data processing system can identify a data key using an encryption policy specific to the resource provider, and encrypt the key value using the public encryption key. The data processing system can store the key value in encrypted form. The data processing system can generate, using the key value in encrypted form, a data report, and provide access to the data report.

20 Claims, 3 Drawing Sheets

(51) Int. Cl.
*H04L 9/08* (2006.01)
*H04L 67/10* (2022.01)
*H04L 67/53* (2022.01)
*G06Q 30/02* (2012.01)

(56) References Cited

OTHER PUBLICATIONS

International Search Report and Written Opinion for PCT Appln. Ser. No. PCT/US2020/026139 dated Dec. 8, 2020 (16 pages).
Office Action for KR Appln. Ser. No. 10-2021-7000487 dated Apr. 16, 2021 (7 pages).
Communication Under Rule 71(3) issued in European Patent Application No. 20722723.2, dated Nov. 2, 2021.
Office Action issued in Korean Patent Application No. 1020217000487, dated Apr. 16, 2021.

* cited by examiner

SYSTEMS AND METHODS FOR ENCRYPTION OF CONTENT REQUEST DATA

CROSS-REFERENCE TO RELATED APPLICATIONS

The present application is a National Stage Application, filed under 35 U.S.C. 371, of International Patent Application No. PCT/US2020/026139 filed on Apr. 1, 2020 titled "SYSTEMS AND METHODS FOR ENCRYPTION OF CONTENT REQUEST DATA," the entirety of which is incorporated by reference herein.

BACKGROUND

In a computer-networked environment such as the internet, third-party content providers provide third-party content items for display on end-user computing devices. These third-party content items, for example, advertisements, can be displayed on a web page associated with a respective publisher, a client application, or a gaming application among others.

SUMMARY

At least one aspect is directed to a system comprising at least one processor and a memory storing computer-executable instructions. The computer-executable instructions, when executed by the at least one processor, can cause the at least one processor to receive a public encryption key from a resource provider system associated with a resource provider for encrypting at least a portion of data received in requests for content associated with the resource provider. The resource provider system can maintain a private encryption key corresponding to the public encryption key. The at least one processor can receive, from a client device, a request for content identifying an information resource of the resource provider. The request can include one or more data values for reporting back to the resource provider system. Each data value of the one or more data values can be associated with a respective data key. The at least one processor can identify, using an encryption policy specific to the resource provider, a data value of the one or more data values. The encryption policy can indicate a set of data keys for which a data storage restriction applies to corresponding data values. The at least one processor can determine to apply the data storage restriction to the data value based on determining that the data value corresponds to a data key included in the set of data keys. The at least one processor can encrypt, responsive to applying the data storage restriction to the data value, the data value with the public encryption key to generate an encrypted data value. The at least one processor can store, in a database associated with the data processing system, the encrypted data value in association with data related to at least one event associated with the request for content. The at least one processor can generate, using the encrypted data value, a report indicative of performance data associated with one or more information resources of the resource provider and requests for content made by the one or more information resources. The at least one processor can provide access to the report for the resource provider. The encrypted data value can be decrypted using the private key maintained by the resource provider system.

At least one aspect is directed to a method comprising receiving, by a data processing system including one or more processors, a public encryption key from a resource provider system associated with a resource provider for encrypting at least a portion of data received in requests for content associated with the resource provider. The resource provider system can maintain a private encryption key corresponding to the public encryption key. The method can include the data processing system receiving, from a client device, a request for content identifying an information resource of the resource provider. The request can include one or more data values for reporting back to the resource provider system. Each data value of the one or more data values can be associated with a respective data key. The method can include the data processing system identifying, using an encryption policy specific to the resource provider, a data value of the one or more data values. The encryption policy can indicate a set of data keys for which a data storage restriction applies to corresponding data values. The method can include the data processing system determining to apply the data storage restriction to the data value based on determining that the data value corresponds to a data key included in the set of data keys. The method can include the data processing system encrypting, responsive to applying the data storage restriction to the data value, the data value with the public encryption key to generate an encrypted data value. The method can include the data processing system storing, in a database associated with the data processing system, the encrypted data value in association with data related to at least one event associated with the request for content. The method can include the data processing system generating, using the encrypted data, a report indicative of performance data associated with one or more information resources of the resource provider and requests for content made by the one or more information resources. The method can include the data processing system providing access to the report for the resource provider. The encrypted data value can be decrypted using the private key maintained by the resource provider system.

At least one aspect is directed to a non-transitory computer-readable medium storing computer-executable instructions, which when executed by at least one processor, cause the at least one processor to receive a public encryption key from a resource provider system associated with a resource provider for encrypting at least a portion of data received in requests for content associated with the resource provider. The resource provider system can maintain a private encryption key corresponding to the public encryption key. The at least one processor can receive, from a client device, a request for content identifying an information resource of the resource provider. The request can include one or more data values for reporting back to the resource provider system. Each data value of the one or more data values can be associated with a respective data key. The at least one processor can identify, using an encryption policy specific to the resource provider, a data value of the one or more data values. The encryption policy can indicate a set of data keys for which a data storage restriction applies to corresponding data values. The at least one processor can determine to apply the data storage restriction to the data value based on determining that the data value corresponds to a data key included in the set of data keys. The at least one processor can encrypt, responsive to applying the data storage restriction to the data value, the data value with the public encryption key to generate an encrypted data value. The at least one processor can store, in a database associated with the data processing system, the encrypted data value in association with data related to at least one event associated with the request for content. The at least one processor can generate, using the encrypted data value, a report indicative of performance data associated with one or more information resources of the resource provider and requests for content made by the one or more information resources. The at least one processor can provide access to the report for the resource provider. The encrypted data value can be decrypted using the private key maintained by the resource provider system.

These and other aspects and implementations are discussed in detail below. The foregoing information and the following detailed description include illustrative examples of various aspects and implementations, and provide an overview or framework for understanding the nature and character of the claimed aspects and implementations. The drawings provide illustration and a further understanding of the various aspects and implementations, and are incorporated in and constitute a part of this specification. It will be appreciated that aspects and implementations can be combined and features described in the context of one aspect or implementation can be implemented in the context of other aspects.

BRIEF DESCRIPTION OF THE DRAWINGS

The accompanying drawings are not intended to be drawn to scale. Like reference numbers and designations in the various drawings indicate like elements. For purposes of clarity, not every component may be labeled in every drawing. In the drawings.

DETAILED DESCRIPTION

Below are more detailed descriptions of various concepts related to, and implementations of, methods, apparatuses, and systems of protecting integrity and privacy of data included in content requests, such as third-party content requests. The various concepts introduced above and discussed in detail below can be implemented in any of numerous ways, as the described concepts are not limited to any particular manner of implementation. For example, while herein content or content items may be referred to as advertisements, it will be appreciated that the content or content items may be any suitable content.

A content distribution system, such as an ad distribution system, can serve third-party content, e.g., ads, responsive to content requests from client devices. Each content request can identify an information resource of a resource provider that triggered the request for content on a respective client device. Examples of information resources can include a web page, a client application or a component thereof, a social media platform or a component thereof, a gaming platform or component thereof, or a gaming application or component thereof, among others. The resource provider can include a publisher or owner of the information resource or an agent thereof. The information resource can include executable instructions, which when executed by the client device can cause the client device to send the request for content to the content distribution system or a data processing system thereof. For example, a web page can include content slots (e.g., ad slots) including respective computer-executable instructions. When executed by the client device, the computer executable instructions for a content slot cause the client device to send a request for a content item for display in the content slot.

A resource provider system of the resource provider can communicate with the content distribution system. The resource provider system can receive performance data, for example, of one or more information resources of the resource provider from the content distribution system. The performance data can include, for example, the number of content items served on an information resource, the number or rate of client device interactions with content items served on the information resource, the number or rate of conversions of content items served on the information resource, earnings data of the resource provider or a combination thereof, among others. The performance data can include statistical data, deterministic data or a combination of both. The content distribution system can arrange or categorize the performance data according to one or more contextual criteria. The contextual criteria can include, for example, date or timing of requests for content, client device type, client device identifier (ID), user account, client device geographical location, the information resource triggering the request for content, a stage (e.g., gaming or application stage) at which the request for content is made or a combination thereof, among others. The use of contextual criteria (or contextual data) can help the resource provider system, or the resource provider, optimize the performance of the respective information resources.

The client device, upon executing instructions of the information resource (e.g., instructions of a respective content slot), can insert or embed data segments in the request for content. The data segments can include one or more contextual criteria to facilitate the reporting of performance data to the resource provider system in accordance with the contextual criteria. For example, the executable instructions can cause the client device to embed, in the request for content, one or more data values, such as a time value, date value, client device type, client device ID, user account number, client device location, information resource ID or URL, gaming stage ID, video frame ID or number, or a combination thereof among others. Each data value can correspond to a respective data key (or data field). The data values included in the request for content can be of sensitive nature and can include information that the resource provider (or resource provider system) would like to keep confidential or private.

Sending the data values (e.g., indicative of contextual data) to the content distribution system can increase the risk of exposure of such data to potential unauthorized access or misuse. For instance, the content distribution system can store the data received in the requests for content in a database. A breach of the security of the database can lead to unauthorized access of the data stored therein. In addition, performance data reports sent by the content distribution system to the resource provider system can be subject to, for example, man-in-the-middle attack (MITM) attacks. Any breach of the data provided in the requests for content can have damaging consequences to both the resource provider and the content distribution system, and can increase potential liability of at least the content distribution system if not the liability of both.

In order to enhance the security of contextual data sent in requests for content, information resources can cause client devices to encrypt the key values (or data values corresponding to respective data keys). For example, an information resource can include encryption instructions, which when executed by a client device accessing the information resource, can cause the client device to encrypt the key values and insert the encrypted key values in a request for content. However, a resource provider may select a list of data keys whose key values are to be encrypted, and such subset may change over time. The dynamic nature of the list of data key whose key values are to be encrypted calls for continuous updates to the executable instructions of the information resource or for communicating the list of data keys, whose corresponding key values are to be encrypted, to client devices. On one hand, continuous updates to the executable instructions of the information resource can put an undesired burden on the resource provider, as changes to the list of data keys can be relatively frequent. On the other hand, communicating the list of data keys whose key values are to be encrypted to client devices with each request for content to be made can lead to inefficient use of the communication bandwidth and the computational resources of the client device.

Also, given that the instructions of the information resource execute on client devices, there is some risk that client devices can meddle with the instructions of the information resource, for example, by eliminating respective encryption instructions or modifying the encryption key used therein. Finally, with respect to encryption at the client device level, there is an implicit expectation that all, or at least most of, information resources would include encryption instructions to encrypt key values using a public encryption key of the resource provider. Such expectation may not be reasonable leading to non-encrypted key values in many content requests.

In the current disclosure, the content distribution system can enforce data storing restrictions, with respect to contextual data received in requests for content and logged by the content distribution system, based on policies specified by, or associated with, resource provider systems or respective resource providers. A resource provider system can specify a list (or set) of data keys whose corresponding data values are to be stored or logged by the content distribution system in an encrypted form. For instance, each resource provider system can provide the list of data keys whose corresponding values are to be encrypted and a respective public encryption key to the content distribution system. In some implementations, the content distribution system can infer the list of data keys whose corresponding values are to be encrypted based on, for example, one or more properties known to the content distribution system. Upon receiving a request for content identifying an information resource of the resource provider system, the content distribution system can identify which data values in the request correspond to data keys in the list provided by the resource provider system. The content distribution system can encrypt the identified values and store them in the database in encrypted form. When generating and/or providing reports to the resource provider system, the content distribution system can use the encrypted form of the key values. Upon receiving a performance report, the resource provider system can use a private key, corresponding to the public key, to decrypt any data values included in the report in encryption form.

The above-described data storing restriction approach maintains the feature of reporting data (e.g., performance reports) to resource provider systems based on a variety of contextual data or criteria, while at the same time enhancing the integrity and security of the contextual data received in content requests. Storing (or logging) at least a portion of such data in encrypted form prevents even the data processing system from accessing the logged data. Once the data is encrypted, the data processing is unable to decrypt and access the data. Also, implementing the encryption at the content distribution system allows for data protection for all resource providers. In some implementations, the content distribution system may use the key values to select content items prior to the encryption.

Figure 1:
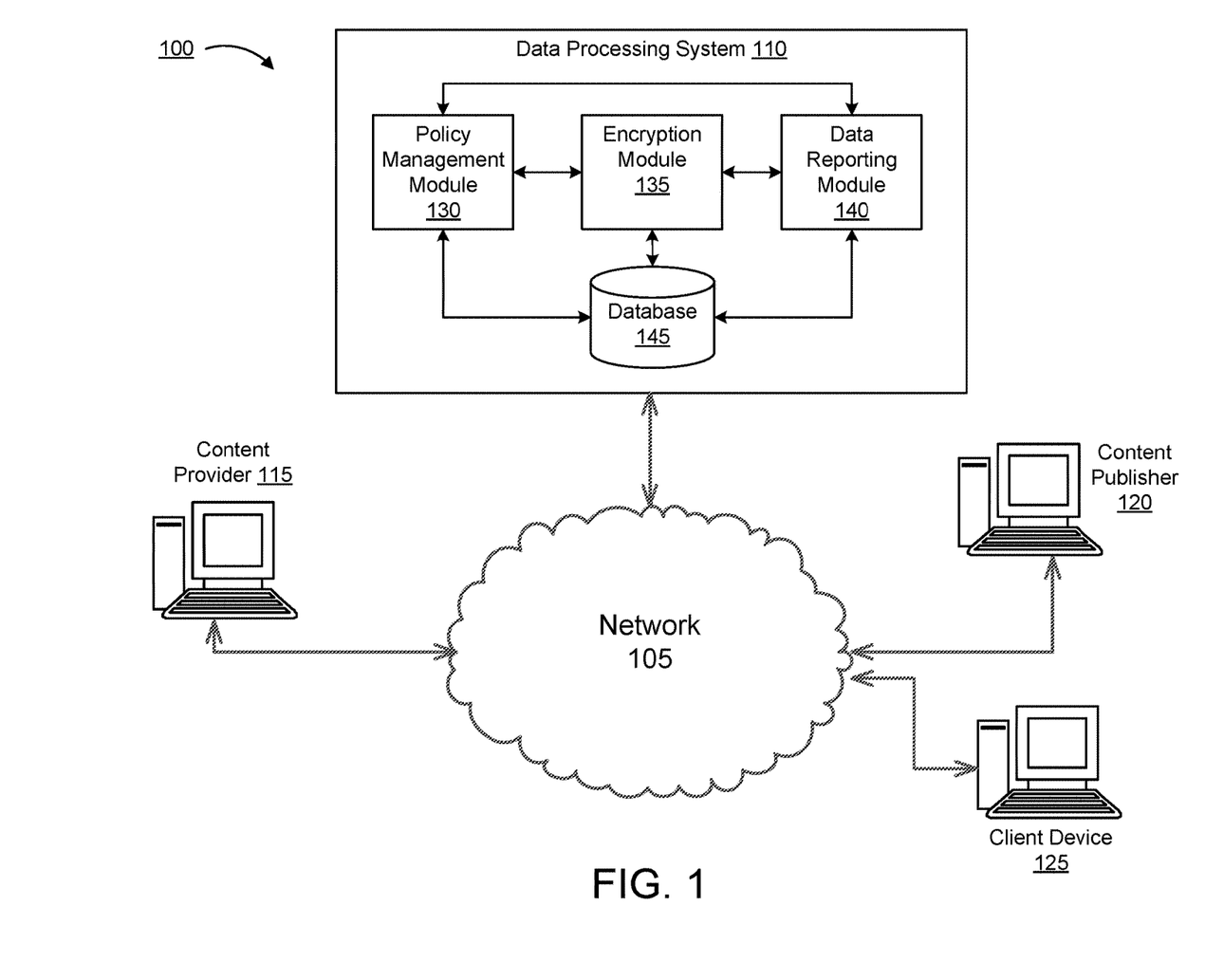
FIG. 1 is a block diagram depicting one implementation of an environment for enforcing data storing (or logging) restrictions on data provided in content requests, according to an illustrative implementation.

FIG. 1 is a block diagram depicting one implementation of an environment 100 for enforcing data storing (or logging) restrictions on data provided in content requests, according to an illustrative implementation. The environment 100 can include at least one data processing system 110, one or more content provider computing devices 115, one or more publisher computing devices 120, one or more client devices 125, and a network 105. The data processing system 110, the one or more content provider computing devices 115, the one or more publisher computing devices 120, and the one or more client devices 125 can be communicatively coupled to each other via the network 105.

The data processing system 110 can include at least one processor (or a processing circuit) and a memory. The memory can store computer-executable instructions that, when executed by the at least one processor, cause the at least one processor to perform one or more of the operations described herein. The at least one processor can include a microprocessor, application-specific integrated circuit (ASIC), field-programmable gate array (FPGA), etc., or combinations thereof. The memory can include, but is not limited to, electronic, optical, magnetic, or any other storage or transmission device capable of providing the at least one processor with program instructions. The memory can include a floppy disk, CD-ROM, DVD, magnetic disk, memory chip, ASIC, FPGA, read-only memory (ROM), random-access memory (RAM), electrically-erasable ROM (EEPROM), erasable-programmable ROM (EPROM), flash memory, optical media, or any other suitable memory from which the at least one processor can read instructions. The instructions can include code from any suitable computer-programming language. The data processing system 110 can include one or more computing devices or servers that can perform various functions. In some implementations, the data processing system 110 can include an advertising auction system configured to host auctions. In some implementations, the data processing system 110 may not include the advertising auction system, but can communicate with the advertising auction system via the network 105.

The network 105 can include computer networks such as the Internet, a local area network (LAN), a wide area network (WAN), a metropolitan area networks, one or more intranets, a satellite network, a cellular or network, an optical network, other type of a data network, or a combination thereof. The data processing system 110 can communicate via the network 105 with the one or more content provider computing devices 115, the one or more content publisher computing devices 120, or the one or more client devices 125. The network 105 can include any number of network devices, such as gateways, switches, routers, modems, repeaters, and wireless access points among others. The network 105 can also include computing devices such as computer serves. The network 105 can also include any number of hardwired and/or wireless connections.

The one or more content provider computing devices 115 can include computer servers, personal computers, handheld devices, smart phones, or other computing devices operated by a content provider entity, such as an advertiser or an agent thereof. The one or more content provider computing devices 115 can provide content, such as textual content, image content, video content, animation content, content items (e.g., creatives or ads), and/or uniform resource locators among other types of content, to the data processing system 110 for display in information resources. Specifically, the one or more content provider computing devices 115 of a given content provider can be the source of content items or content used to generate content items of that content provider. The content items can be for display in information resources rendered on client devices 125, such as websites, webpages of search results, client applications, gaming applications or platforms, open source content sharing platforms (e.g., YOUTUBE, DAILYMOTION, or VIMEO), or social media platforms, among others.

The data processing system 110 can provide one or more user interfaces accessible via the content provider computing devices 115 to allow content provider entities to generate respective content provider accounts, or generate respective campaigns (e.g., ad campaigns). The user interface(s) can allow content provider entities to upload respective content, such as content items, uniform resource locators (URLs) of respective landing pages, or media content for use to create content items, to the data processing system 110 or other remote systems. The content provider computing devices 115 can provide other information via the user interface(s), such as payment and budget information, preferences or restrictions with respect to when and where to serve content items, or a combination thereof among others.

The content publisher computing device 120 can include servers or other computing devices operated by a content publishing entity to provide primary content for display via the network 105. The primary content can include websites, webpages, client applications, gaming content, social media content, or open source content sharing webpages among others for display on the client devices 125. Pages, video segments or other units of the primary content can include executable instructions, such as instructions associated with content slots (e.g., ad slots) that cause the client device 125 to request third-party content from the data processing system 110 or other remote systems when the primary content is displayed on the client device. In response to such a request, the data processing system or other remote system can run an auction to determine which content items to provide to the client device 125. In some implementations, the content publisher computing device 120 can include a server for serving (or streaming) video or gaming content. The content publisher computing device 120 can upload, to the data processing system 110, a public encryption key and a list of data keys whose corresponding values are to be encrypted with the public encryption key.

The data processing system 110 can provide one or more user interfaces accessible via the content publisher computing devices 120 to allow resource provider entities to generate respective resource provider accounts. In generating a respective account, a content publisher system (or computing device 120) can provide respective domain names and URLs of respective webpages via the user interface(s). The domain names and/or the webpage URLs allow the data processing system to identify content requests generated by webpages of the resource provider. Specifically, the content request can include an identifier (e.g., URL or domain name) of the webpage triggering the request for content on the client device 125. The data processing system 110 can match the identifier in the content request to a URL or domain name provided by the resource provider.

The client device 125 can include a computing device configured to acquire and display primary content associated with content publishers (or resource providers) as well as third-party content (e.g., third-party content items such as ads) provided by the content provider computing device 115. The client device can request and receive such content via the network 105. The client device 125 can include a desktop computer, laptop computer, tablet device, smartphone, personal digital assistant, mobile device, consumer computing device, server, digital video recorder, set-top box, smart television, video game console, or any other computing device capable of communicating via the network 105 and consuming media content. While FIG. 1 shows a single client device 125, the environment 100 can include a plurality of client devices 125 served by the data processing system 110. Similarly, a plurality of content provider computing devices 115 and/or a plurality of content publisher computing devices 120 can be communicatively coupled to the data processing system 110 via the network 105.

The data processing system 110 can include at least one computer server having one or more processors and memory to store computer-executable instructions. For instance, the data processing system 110 can include a plurality of computer servers located in at least one data center or server farm. In some implementations, the data processing system 110 can include a third-party content placement system, e.g., an ad server or ad placement system. The data processing system 110 can include a policy management module 130, an encryption module 135, a data reporting module 140, and database 145. Each of the policy management module 130, the encryption module 135 and the data reporting module 140 can be implemented as a software module, hardware module or a combination of both. For example, each of these modules can include a processing unit, server, virtual server, circuit, engine, agent, appliance, or other logic device such as programmable logic arrays configured to communicate with the database 145 or with other computing devices via the network 105. The computer-executable instructions of the data processing system 110 can include instructions, which when executed by one or more processors, cause the data processing system 110 to perform operations discussed below with regard to FIG. 2, and in relation with the policy management module 130, the encryption module 135, the data reporting module 140, and the database 145.

Figure 2:
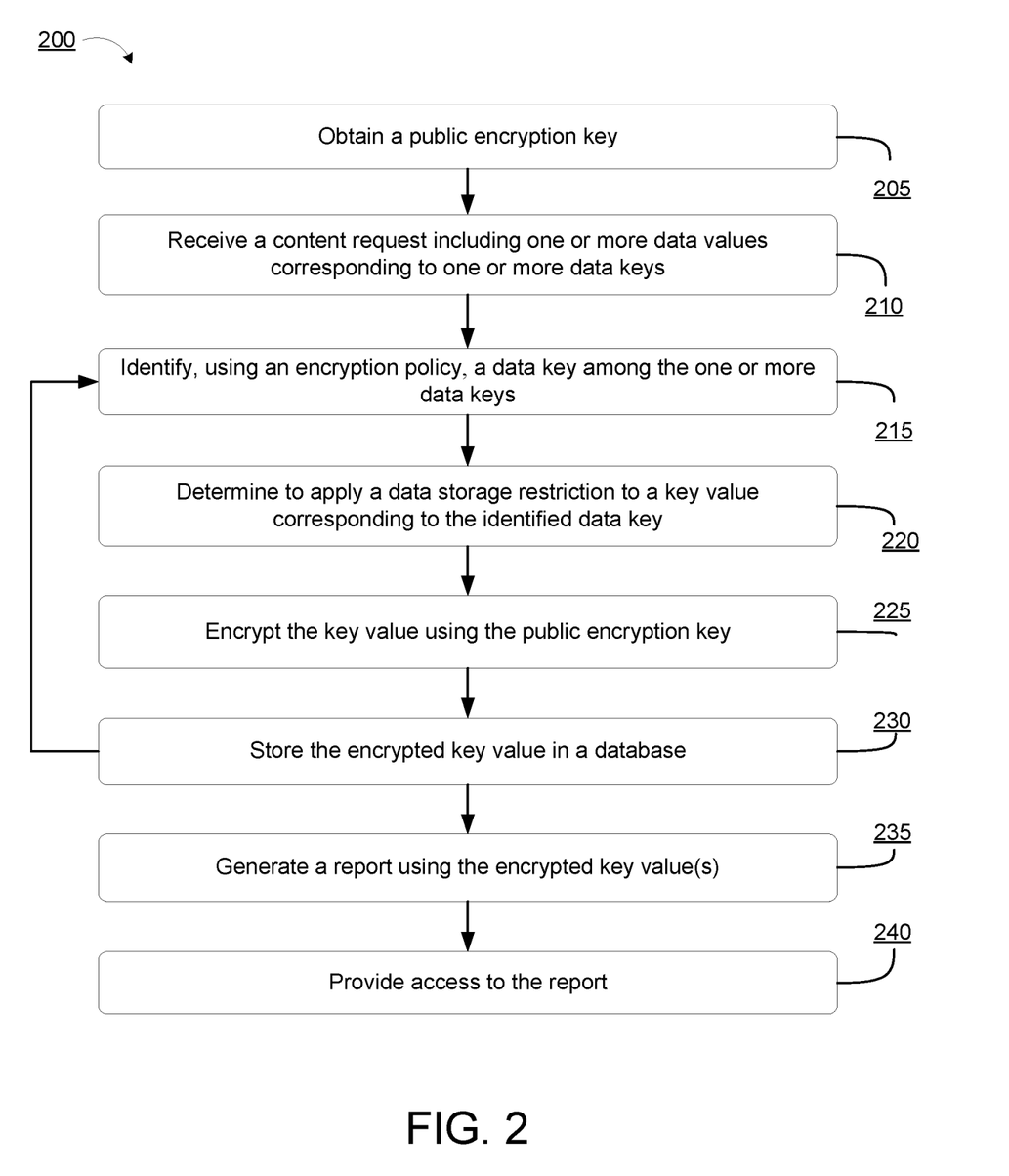
FIG. 2 is a flow chart illustrating a method for restricting storage of data received.

Referring to FIG. 2, a flow chart illustrating a method 200 for restricting storage of data received in content requests is described. The method 200 can include obtaining a public encryption key (STEP 205). The method 200 can include receiving a content request including one or more key values corresponding to one or more data keys (STEP 210), and identifying a data key using an encryption policy (STEP 215). The method 200 can include determining to apply a data storage restriction to the data value corresponding to the identified data key (STEP 220), and encrypting the key value using the public encryption key (STEP 225). The method 200 can include storing the key value in encrypted form (STEP 230). The method 200 can include generating, using the key value in encrypted form, a report (STEP 235), and providing access to the report (STEP 240).

Referring to FIGS. 1 and 2, the method 200 can include the data processing system 110 obtaining a public encryption key of a resource provider (STEP 205). For instance, the policy management module 130 can receive the public encryption key from a resource provider system associated with a resource provider (or content publisher). The policy management module 130 can provide, for example, a user interface for access by the content publisher computing devices 120. A content publisher computing device 120 associated with the resource provider can access the user interface and provide the public encryption key. The public encryption key can be for use by the data processing system 110 to encrypt at least a portion of data received in content requests associated with the resource provider. The content requests can be triggered by an information resource of the resource provider accessed by a client device 125. The resource provider system, or a content publisher computing device 120 thereof, can maintain a private encryption key corresponding to the public encryption key.

The method 200 can include the data processing system 110 receiving, from the client device 125, a request for content including one or more data values (STEP 205). The request can identify an information resource of the resource provider, and can include one or more data values corresponding to one or more data keys. An information resource (e.g., a webpage, client application, gaming application, or a page or unit of a social media platform) of the resource provider, when accessed by the client device 125, can trigger a request for third-party content that is sent by the client device 125 to the data processing system 110. The request for third party content can include one or more data values (or key values) representing values for one or more corresponding data keys (or data fields). The data keys can include, for example, one or more keywords for use to select content items, a device ID of the client device 125, a user account associated with the client device 125, a geographical location of the client device 125, a stage of the information resource at which the request is triggered, a set of navigated pages prior to triggering the content request, or a combination thereof among others.

The data values can be for use by the data processing system 110 in reports (e.g., performance reports) provided or sent to the resource provider system. For example, the data processing system 110 can include at least a portion of the data values in data reported back to the resource provider system. The data values can be provided in the request for content as free-form text. For example, the request can include a sequence of data key-data value (or key-value) pairs.

The policy management module 130 can receive, the network 105, an indication of an encryption policy, specific to the resource provider, from the content publisher computing device 120. The content publisher computing device 120 can provide the indication of the encryption policy via the user interface or an application programming interface (API), among others. The encryption policy can indicate a set or list of data keys for which a data storage restriction applies to the corresponding data values. For example, the encryption policy can specify a list or set of data keys (or data fields) whose corresponding data values (or key values), when provided in content requests, are to be maintained in encrypted form by the data processing system 110. The policy management module 130 can maintain a data structure associating the encryption policy, the list of data keys, and/or the public encryption key to a resource provider account or a domain name of the resource provider. In case the resource provider has multiple domains or applications, the resource provider may provide a separate public encryption key and/or a separate encryption policy for each domain or application.

In some implementations, the policy management module 130 can receive an indication of the set of data keys for which the data storage restriction applies to corresponding data values. The policy management module 130 can generate, in a data structure, the encryption policy specific to the resource provider using the indication of the indication of the set of data keys. For example, the policy management module 130 can generate a table (or other data structure) listing the data keys, the action (e.g., encryption) to be performed on the data values corresponding to each data key, and a description or details of each listed action. The description or details of each action can include the public encryption key to be used to perform an encryption action. Such data structure can allow for defining separate actions or separate public encryption keys for distinct data keys.

The database 145 can store data associated with the resource provider account, such as URLs or identifiers of information resources, the public encryption key, information indicative of the encryption policy, and/or other data provided by the resource provider system (or the content publisher computing device 120). The policy management module 130 can update the resource provider data in the database 145, for example, responsive to new data or modifications provided by the resource provider system or the corresponding content publisher computing device 120. In the case where the content publisher computing device 120 provides a public encryption key but does not specify an encryption policy to be used, the policy management module 130 can associate a default encryption policy with resource provider account. For example, the default encryption policy can impose that all key values should be maintained in encrypted form The method 200 can include the data processing system 110 identifying, using the encryption policy specific to the resource provider, a data key of the one or more data keys with the corresponding data value in the content request (STEP 215), and determining to apply the data storage restriction to the data value corresponding to the identified data key (STEP 220). The encryption policy module 130 can scan the request for content to retrieve a URL or other identifier identifying the information resource generating the request or the corresponding resource provider. Using the retrieved URL or identifier identifying the information resource, the policy management module 130 can identify a resource provider account associated with the information resource, and determine the encryption policy associated with the resource provider account. For example, the policy management module 130 can retrieve the terms or rules of the encryption policy. The terms or rules can include the list of data keys, if any, to which the encryption policy (or data storage restriction) applies. The policy management module 130 can also identify, from the request for content, data keys with corresponding data values included in the request.

If the resource provider account indicates a default encryption policy, the policy management module 130 can determine that the data storage restriction is to be applied to all data values (or key values) in the request for content. The data storage restriction can imply that the data values are to be logged (or stored) in encrypted form by the data processing system 110. If the encryption policy is not a default policy, the policy management module 130 can compare the data keys whose corresponding data values are included in the content request to data keys listed in the encryption policy associated with resource provider account. Based on the comparison, the policy management module 130 can identify a data value in the request whose corresponding data key matches one of the data keys listed by the encryption policy of the resource provider account. The policy management module 130 can identify more than one data value in the request whose corresponding data keys match other data keys listed by the encryption policy of the resource provider account. The policy management module 130 can determine that the data storage restriction is to be applied to the identified data value(s).

The data storage restriction can dictate that the identified data values are to be maintained in encrypted form (but not in non-encrypted form) by the data processing system 110. The data processing system 110 cannot maintain any of the identified data values in non-encrypted form. As such, the data storage restriction imposes an added layer of data security (e.g., encryption) for the identified data values.

The method 200 can include the data processing system 110 encrypting, responsive to applying the data storage restriction to the data value(s), the data value(s) with the public encryption key to generate the corresponding encrypted data value(s) (STEP 225). The policy management module 130 can provide the identified data value(s) to the encryption module 135. The policy management module 130 may also provide the public encryption key to the encryption module 135. The encryption module 135 can retrieve the public encryption key from the database 145 or from a data structure. The encryption module 135 can encrypt the identified data values using the public encryption key. The encryption module 135 can encrypt each of the identified data values separately.

The encryption module 135 can concatenate each of the identified data values with a "salt" value. The "salt" value can include a random data string or a random number. By concatenating the data value with the data string, the encryption module 135 can generate a modified data value (or a modified version of the data value). The modified data value can have, for example, the form "salt:value" or "value:salt" where "value" represents the data value and "salt" represents the salt value. The encryption module 135 can add the salt value before, after or somewhere in the middle of the data value to form the modified data value. The colon in "salt:value" and "value:salt" is used just for readability, but the encryption module 135 does not have to include the colon when generating the modified data value.

The encryption module 135 can encrypt the modified data value to generate the encrypted version of the data value. Concatenating the data value with the "salt" value adds another layer of data protection. Even if an intruding entity was to successfully decrypt the encrypted version of the data value, that entity would not be able to distinguish the original data value from the salt value in the modified data value. The resource provider system, or the content publisher computing device 120, can have prior knowledge of the structure of the modified data value. For example, the content publisher computing device 120 can know the length and position of the salt value within the modified data value. The length and position of the salt values used can vary from one resource provider to another. The data processing system 110, or the encryption module 135, can provide an indication of the length and position (e.g., the starting point and length) of the salt value to the content publisher computing device 120. In general, the length and position of the salt value within modified data values can be specific to the resource provider.

The method 200 can include the data processing system 110 storing the encrypted data value(s) in association with data related to at least one event associated with the request for content (STEP 230). The data reporting module 140 can store and maintain data in the database 145 related to, for example, content items served in response to each request, client device interactions with served content items, amount of money earned by resource provider in response to displaying the content items on the information resource, or a combination thereof among others. The data reporting module 140 can store such data in association with the encrypted data value(s).

For example, the data reporting module 140 can store indications of content items served to the client devices 125 in response to requests for content including a specific keyword. The data reporting module 140 can maintain a data structure (e.g., a table or a linked list) that associates the encrypted data value corresponding to the specific keyword to the indications of such content items in association with. In a similar way, the data reporting module 140 can maintain a data structure that associates an encrypted data value corresponding to a geographic location (where one or more client devices 125 were located when they requested content) to content items that were served to the client devices 125 at the geographic location and that triggered client device interactions. The data reporting module 140 can maintain a list of encrypted data values representing keywords that lead to inappropriate or offensive content being served to client devices 125. The data reporting module 140 can store various other data structures that associate one or more of the encrypted data values to data indicative of events associated with content requests including the key values corresponding to the one or more encrypted data values.

In some implementations, the data reporting module 140 can store the encrypted data values in association with indications of the corresponding data keys. The indications of the data keys can be stored in non-encrypted form. As such, the data reporting module 140 can search the stored data based on the data keys as corresponding indications are stored in non-encrypted form. In other words, the encrypted data key values can be stored or logged in association with corresponding non-encrypted plain-text data keys.

The method 200 can include the data processing system 110 generating a report using the encrypted data values stored in the database (STEP 235). For example, the data reporting module 140 can generate one or more reports including all data logged for a given information resource or a given resource provider. In some implementations, the data reporting module 140 can receive a query for performance data from the content publisher computing device 120. The query can be for performance of various keywords, for example, with respect to the content items served and interactions with the served content items. The data reporting module 140 can generate a report listing the performance of various keywords. In the report, the keywords can be presented in encrypted form. In some implementations, the data reporting module 140 can generate one or more predefined reports on a regular basis. The content publisher computing device 120 can define the data to be included in the reports, for example, through a user interface provided by the data processing system 110.

The method 200 can include the data processing system 110 providing access to the report for the resource provider system (or the content publisher computing device 120). The data reporting module 140 can transmit a generated report to the content publisher computing device 120. The report can include encrypted data values, such as encrypted versions of keywords or geographical locations used in content requests associated with the resource provider system. Upon receiving the report, the content publisher computing device 120 can use the private decryption key corresponding to the public encryption key of the resource provider to decrypt the encrypted data values in the report.

In some implementations, the data reporting module 140 can provide access to generated reports via a respective webpage or a respective client application. For instance, the resource provider system can maintain an encrypted copy of the respective private decryption key in a remote computing device, for example, on the cloud. The data reporting module 140 can provide a user interface accessible by the content publisher computing device 120. The user interface can allow the content publisher computing device 120 to provide a link to the encrypted copy of the private decryption key, and a password for use to decrypt the encrypted copy of the private decryption key. In some implementations, the user interface can also allow the content publisher computing device 120 to provide a query indicative of data to be reported to the resource provider system or to the content publisher computing device 120.

The data reporting module 140 can generate a report, as discussed above, for presenting to the content publisher computing device 120. The data reporting module 140, for example, can use the query or predefined report formats to identify data to be presented to the content publisher computing device 120. The data reporting module 140 can download the encrypted copy of the private decryption key using the link provided via the user interface, and decrypt the encrypted copy using the password provided by the content publisher computing device 120. The data reporting module 140 can use the private decryption key to decrypt any encrypted data values in the data to be presented (or reported) to the content publisher computing device 120. The data reporting module 140 can then present the reporting data (or the report), with the data values in non-encrypted form, on the respective webpage or the respective client application. The data reporting module 140 (or the data processing) does not save or maintain any copy of the private key after decrypting encrypted data values.

The methods and systems described herein allow for enhancing the integrity and security of resource provider data maintained by the data processing system 110 while still providing the resource provider access to such data. The data storage restriction applied by the data processing system 110 significantly reduces any risk of jeopardizing the privacy or integrity of sensitive data keys and corresponding data values embedded in content requests made by information resources of resource providers.

It is to be noted that the data (or reports) reported to resource provider systems by the data processing system 110 can be of any format. It can include statistical performance data and/or deterministic performance data. The data can include textual data, image data, charts data, video data or data in other formats.

For situations in which the systems discussed here collect personal information about users, or may make use of personal information, the users may be provided with an opportunity to control whether programs or features that may collect personal information (e.g., information about a user's social network, social actions or activities, a user's preferences, or a user's current location), or to control whether or how to receive content from the content server that may be more relevant to the user. In addition, certain data may be treated in one or more ways before it is stored or used, so that certain information about the user is removed when generating parameters (e.g., demographic parameters). For example, a user's identity may be treated so that no identifying information can be determined for the user, or a user's geographic location may be generalized where location information is obtained (such as to a city, ZIP code, or state level), so that a particular location of a user cannot be determined. Thus, the user may have control over how information is collected about the user and used by a content server.

Figure 3:
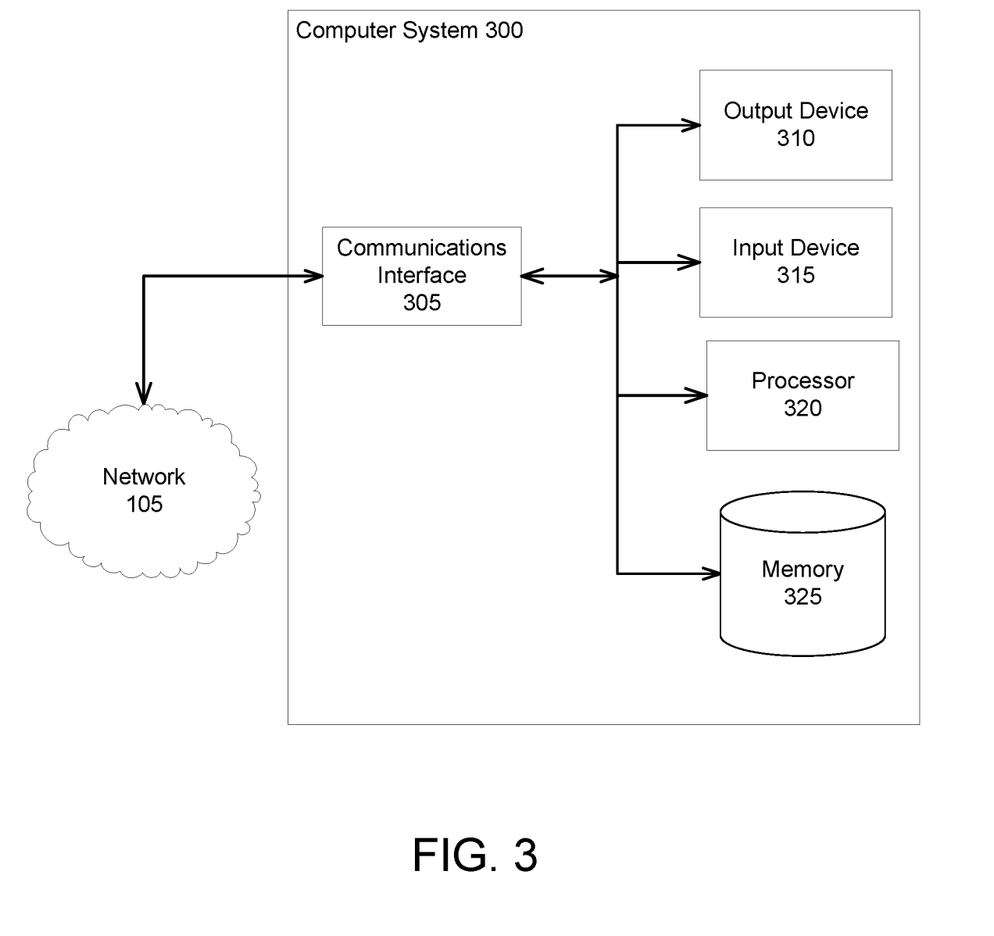
FIG. 3 shows the general architecture of an illustrative computer system, according to an illustrative implementation.

FIG. 3 shows the general architecture of an illustrative computer system 300 that may be employed to implement any of the computer systems discussed herein, including the system 110 and its components such as the policy management module 130, the encryption module 135, and the data reporting module 140, in accordance with some implementations. The computer system 300 can be used to provide information via the network 105 for display. The computer system 300 of FIG. 3 comprises one or more processors 320 communicatively coupled to memory 325, one or more communications interfaces 305, and one or more output devices 310 (e.g., one or more display units) and one or more input devices 315. The processors 320 can be included in the data processing system 110 or the other components of the system 110 such as the policy management module 130, the encryption module 135, and the data reporting module 140.

In the computer system 300 of FIG. 3, the memory 325 may comprise any computer-readable storage media, and may store computer instructions such as processor-executable instructions for implementing the various functionalities described herein for respective systems, as well as any data relating thereto, generated thereby, or received via the communications interface(s) or input device(s) (if present). Referring again to the environment 100 of FIG. 1, the data processing system 110 can include the memory 325 to store data structures and/or information related to, for example, resource provider accounts, among others. The memory 325 can include the database 145. The processor(s) 320 shown in FIG. 3 may be used to execute instructions stored in the memory 325 and, in so doing, also may read from or write to the memory various information processed and or generated pursuant to execution of the instructions.

The processor 320 of the computer system 300 shown in FIG. 3 also may be communicatively coupled to or control the communications interface(s) 305 to transmit or receive various information pursuant to execution of instructions. For example, the communications interface(s) 305 may be coupled to a wired or wireless network, bus, or other communication means and may therefore allow the computer system 300 to transmit information to or receive information from other devices (e.g., other computer systems). While not shown explicitly in the system of FIG. 1, one or more communications interfaces facilitate information flow between the components of the system 300. In some implementations, the communications interface(s) may be configured (e.g., via various hardware components or software components) to provide a website as an access portal to at least some aspects of the computer system 300. Examples of communications interfaces 305 include user interfaces (e.g., within webpages), through which the user can communicate with the data processing system 110.

The output devices 310 of the computer system 300 shown in FIG. 3 may be provided, for example, to allow various information to be viewed or otherwise perceived in connection with execution of the instructions. The input device(s) 315 may be provided, for example, to allow a user to make manual adjustments, make selections, enter data, or interact in any of a variety of manners with the processor during execution of the instructions. Additional information relating to a general computer system architecture that may be employed for various systems discussed herein is provided further herein.

Implementations of the subject matter and the operations described in this specification can be implemented in digital electronic circuitry, or in computer software embodied on a tangible medium, firmware, or hardware, including the structures disclosed in this specification and their structural equivalents, or in combinations of one or more of them. Implementations of the subject matter described in this specification can be implemented as one or more computer programs, i.e., one or more modules of computer program instructions, encoded on computer storage medium for execution by, or to control the operation of, data processing apparatus. The program instructions can be encoded on an artificially-generated propagated signal, e.g., a machine-generated electrical, optical, or electromagnetic signal that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can include a source or destination of computer program instructions encoded in an artificially generated propagated signal. The computer storage medium can also be, or be included in, one or more separate physical components or media (e.g., multiple CDs, disks, or other storage devices).

The operations described in this specification can be implemented as operations performed by a data processing apparatus on data stored on one or more computer-readable storage devices or received from other sources.

The terms "data processing apparatus", "data processing system", "user device" or "computing device" encompasses all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures. The policy management module 130, the encryption module 135 and the data reporting module 140 can include or share one or more data processing apparatuses, computing devices, or processors.

A computer program (also known as a program, software, software application, script, or code) can be written in any form of programming language, including compiled or interpreted languages, declarative or procedural languages. The computer program can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatuses can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), for example. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, implementations of the subject matter described in this specification can be implemented on a computer having a display device, e.g., a CRT (cathode ray tube), plasma, or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can include any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Implementations of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system 300 can include content provider computing device 115, content publisher computing devices 120, client devices 125, or servers or computing devices of the data processing system 110. For example, the data processing system 110 can include one or more servers in one or more data centers or server farms. A client and server are generally remote from each other and typically interact through a communication network. The relationship of client and server arises by virtue of computer programs running on the respective computers and having a client-server relationship to each other. In some implementations, a server transmits data (e.g., an HTML page) to a client device (e.g., for purposes of displaying data to and receiving user input from a user interacting with the client device). Data generated at the client device (e.g., a result of the user interaction) can be received from the client device at the server.

While this specification contains many specific implementation details, these should not be construed as limitations on the scope of any inventions or of what may be claimed, but rather as descriptions of features specific to particular implementations of the systems and methods described herein. Certain features that are described in this specification in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In some cases, the actions recited in the claims can be performed in a different order and still achieve desirable results. In addition, the processes depicted in the accompanying figures do not necessarily require the particular order shown, or sequential order, to achieve desirable results.

In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products. For example, the content request module 130 and the content selection module 135 can be part of the data processing system 110, a single module, a logic device having one or more processing modules, one or more servers, or part of a search engine.

Having now described some illustrative implementations and implementations, it is apparent that the foregoing is illustrative and not limiting, having been presented by way of example. In particular, although many of the examples presented herein involve specific combinations of method acts or system elements, those acts and those elements may be combined in other ways to accomplish the same objectives. Acts, elements and features discussed only in connection with one implementation are not intended to be excluded from a similar role in other implementations or implementations.

The phraseology and terminology used herein is for the purpose of description and should not be regarded as limiting. The use of "including" "comprising" "having" "containing" "involving" "characterized by" "characterized in that" and variations thereof herein, is meant to encompass the items listed thereafter, equivalents thereof, and additional items, as well as alternate implementations consisting of the items listed thereafter. In one implementation, the systems and methods described herein consist of one, each combination of more than one, or all of the described elements, acts, or components.

Any references to implementations or elements or acts of the systems and methods herein referred to in the singular may also embrace implementations including a plurality of these elements, and any references in plural to any implementation or element or act herein may also embrace implementations including only a single element. References in the singular or plural form are not intended to limit the presently disclosed systems or methods, their components, acts, or elements to single or plural configurations. References to any act or element being based on any information, act or element may include implementations where the act or element is based at least in part on any information, act, or element.

Any implementation disclosed herein may be combined with any other implementation, and references to "an implementation," "some implementations," "an alternate implementation," "various implementation," "one implementation" or the like are not necessarily mutually exclusive and are intended to indicate that a particular feature, structure, or characteristic described in connection with the implementation may be included in at least one implementation. Such terms as used herein are not necessarily all referring to the same implementation. Any implementation may be combined with any other implementation, inclusively or exclusively, in any manner consistent with the aspects and implementations disclosed herein.

References to "or" may be construed as inclusive so that any terms described using "or" may indicate any of a single, more than one, and all of the described terms.

Where technical features in the drawings, detailed description or any claim are followed by reference signs, the reference signs have been included for the sole purpose of increasing the intelligibility of the drawings, detailed description, and claims. Accordingly, neither the reference signs nor their absence have any limiting effect on the scope of any claim elements.

The systems and methods described herein may be embodied in other specific forms without departing from the characteristics thereof. Although the examples provided herein relate to controlling the display of content of information resources, the systems and methods described herein can include applied to other environments. The foregoing implementations are illustrative rather than limiting of the described systems and methods. Scope of the systems and methods described herein is thus indicated by the appended claims, rather than the foregoing description, and changes that come within the meaning and range of equivalency of the claims are embraced therein.

The invention claimed is:

1. A system comprising:
 at least one processor; and
 a memory storing computer-executable instructions, the computer-executable instructions, when executed by the at least one processor, cause the at least one processor to:

receive a public encryption key from a resource provider system associated with a resource provider for encrypting at least a portion of data received in requests for content associated with the resource provider, the resource provider system maintaining a private encryption key corresponding to the public encryption key;

receive, from a client device, a request for content identifying an information resource of the resource provider, the request including one or more data values for reporting back to the resource provider system, each data value of the one or more data values associated with a respective data key;

identify, using an encryption policy specific to the resource provider, a data value of the one or more data values, the encryption policy indicating a set of data keys for which a data storage restriction applies to corresponding data values;

determine to apply the data storage restriction to the data value based on determining that the data value corresponds to a data key included in the set of data keys;

encrypt, responsive to applying the data storage restriction to the data value, the data value with the public encryption key to generate an encrypted data value;

store, in a database associated with a data processing system, the encrypted data value in association with data related to at least one event associated with the request for content;

generate, using the encrypted data value, a report indicative of performance data associated with one or more information resources of the resource provider and requests for content made by the one or more information resources; and provide access to the report for the resource provider, the encrypted data value decrypted using the private encryption key maintained by the resource provider system.

2. The system of claim 1, wherein the computer-executable instructions, when executed by the at least one processor, further cause the at least one processor to:

receive an indication of the set of data keys for which a data storage restriction applies to corresponding data values, the set of data keys including a data key corresponding to the data value; and generate, in a data structure, the encryption policy specific to the resource provider using indication of the set of data keys for which a data storage restriction applies to corresponding data values.

3. The system of claim 1, wherein the computer-executable instructions, when executed by the at least one processor, further cause the at least one processor to compare a data key associated with the data value to the set of data keys for which a data storage restriction applies to corresponding data values.

4. The system of claim 1, wherein the computer-executable instructions, when executed by the at least one processor, further cause the at least one processor to:

concatenate the data value with a data string to generate a modified data value; and
encrypt the modified data value to generate the respective encrypted version of the data value.

5. The system of claim 4, wherein a length and a position of the data string within the modified data value are specific to, and known to, the resource provider.

6. The system of claim 1, wherein the computer-executable instructions, when executed by the at least one processor, further cause the at least one processor to transmit the report to the resource provider system.

7. The system of claim 1, wherein the at least one event associated with the request for content includes an interaction by the client device with a content item served for display on the information resource of the resource provider responsive to the request for content.

8. The system of claim 1, wherein the resource provider maintains an encrypted version of the private encryption key on a computing device.

9. The system of claim 8, wherein the computer-executable instructions, when executed by the at least one processor, further cause the at least one processor to:

provide a user interface to the resource provider for accessing the database;
receive a search query from the user interface;
receive (i) a link to the encrypted version of the private encryption key on the computing device, and (ii) a password to decrypt the encrypted version of the private encryption key; and
decrypt, using the password, the encrypted version of the private encryption key.

10. The system of claim 9, wherein the computer-executable instructions, when executed by the at least one processor, further cause the at least one processor to:

generate the report indicative of performance data responsive to the search query;
decrypt, using the private encryption key, the respective encrypted version of the data value in the report; and
provide the report indicative of performance data for display on the user interface.

11. A method comprising:

receiving, by a data processing system including one or more processors, a public encryption key from a resource provider system associated with a resource provider for encrypting at least a portion of data received in requests for content associated with the resource provider, the resource provider system maintaining a private encryption key corresponding to the public encryption key;

receiving, by the data processing system, from a client device, a request for content identifying an information resource of the resource provider, the request including one or more data values for reporting back to the resource provider system, each data value of the one or more data values associated with a respective data key;

identifying, by the data processing system using an encryption policy specific to the resource provider, a data value of the one or more data values, the encryption policy indicating a set of data keys for which a data storage restriction applies to corresponding data values;

determining, by the data processing system, to apply the data storage restriction to the data value based on determining that the data value corresponds to a data key included in the set of data keys;

encrypting, by the data processing system, responsive to applying the data storage restriction to the data value, the data value with the public encryption key to generate an encrypted data value;

storing, by the data processing system in a database associated with the data processing system, the encrypted data value in association with data related to at least one event associated with the request for content;

generating, by the data processing system and using the encrypted data, a report indicative of performance data associated with one or more information resources of the resource provider and requests for content made by the one or more information resources; and providing, by the data processing system, access to the report for the resource provider, the encrypted data value decrypted using the encryption private key maintained by the resource provider system.

12. The method of claim 11, further comprising:
receiving, by the data processing system, an indication of the set of data keys for which a data storage restriction applies to corresponding data values, the set of data keys including a data key corresponding to the data value; and
generating, by the data processing system in a data structure, the encryption policy specific to the resource provider using the indication of the indication of the set of data keys for which a data storage restriction applies to corresponding data values.

13. The method claim 11, wherein identifying the data value includes:
comparing, by the data processing system, a data key associated with the data value to the set of data keys for which a data storage restriction applies to corresponding data values.

14. The method of claim 11, wherein encrypting the data value with the public encryption key includes:
concatenating the data value with a data string to generate a modified data value; and
encrypting the modified data value to generate the respective encrypted version of the data value.

15. The method of claim 14, wherein a length and a position of the data string within the modified data value are specific to, and known to, the resource provider.

16. The method of claim 11, wherein providing access to the report for the resource provider includes transmitting the report to the resource provider.

17. The method of claim 11, wherein the at least one event associated with the request for content includes an interaction by the client device with a content item served for displayed on the information resource of the resource provider responsive to the request for content.

18. The method of claim 11, wherein the resource provider maintains an encrypted version of the private encryption key on a computing device, and the method further comprising:
providing a user interface to the resource provider for accessing the database;
receiving a search query from the user interface;
receiving (i) a link to the encrypted version of the private encryption key on the computing device, and (ii) a password to decrypt the encrypted version of the private encryption key; and
decrypting, using the password, the encrypted version of the private encryption key.

19. The method of claim 18, comprising:
generating the report indicative of performance data responsive to the search query;
decrypting, using the private encryption key, the respective encrypted version of the data value in the report; and
providing the report indicative of performance data for display on the user interface.

20. A non-transitory computer-readable medium storing computer-executable instructions, the computer-executable instructions, when executed by at least one processor, cause the at least one processor to:
receive, from a client device, a request for content identifying an information resource of the resource provider, the request including one or more data values for reporting back to the resource provider system, each data value of the one or more data values associated with a respective data key;
identify, using an encryption policy specific to the resource provider, a data value of the one or more data values, the encryption policy indicating a set of data keys for which a data storage restriction applies to corresponding data values;
determine to apply the data storage restriction to the data value based on determining that the data value corresponds to a data key included in the set of data keys;
encrypt, responsive to applying the data storage restriction to the data value, the data value with the public encryption key to generate an encrypted data value;
store, in a database associated with a data processing system, the encrypted data value in association with data related to at least one event associated with the request for content;
generate, using the encrypted data value, a report indicative of performance data associated with one or more information resources of the resource provider and requests for content made by the one or more information resources; and
provide access to the report for the resource provider, the encrypted data value decrypted using the private encryption key maintained by the resource provider system.

* * * * *

UNITED STATES PATENT AND TRADEMARK OFFICE
CERTIFICATE OF CORRECTION

PATENT NO. : 11,379,604 B2
APPLICATION NO. : 17/256645
DATED : July 5, 2022
INVENTOR(S) : Jonathan Paul Pearson et al.

Page 1 of 1

It is certified that error appears in the above-identified patent and that said Letters Patent is hereby corrected as shown below:

In the Claims

At Column 21, Line 13, "indication of the indication of the" should be -- indication of the --.

At Column 21, Line 16, "method" should be -- method of --.

At Column 21, Line 37, "displayed" should be -- display --.

Signed and Sealed this
Eighteenth Day of April, 2023

Katherine Kelly Vidal
*Director of the United States Patent and Trademark Office*